(12) United States Patent
Sadr et al.

(10) Patent No.: US 6,170,535 B1
(45) Date of Patent: Jan. 9, 2001

(54) MULTI-LAYER CONDUIT

(75) Inventors: Changize Sadr, North York; Sam Shafiee, Etobicoke, both of (CA)

(73) Assignee: Salflex Polymers Ltd., Weston (CA)

( * ) Notice: Under 35 U.S.C. 154(b), the term of this patent shall be extended for 0 days.

(21) Appl. No.: 09/432,565

(22) Filed: Nov. 12, 1999

Related U.S. Application Data

(63) Continuation-in-part of application No. 09/192,295, filed on Nov. 17, 1998, now abandoned.

(51) Int. Cl.[7] .................................................... F16L 11/12
(52) U.S. Cl. ........................... 138/137; 138/140; 138/141
(58) Field of Search ................................... 138/137, 140, 138/141

(56) References Cited

U.S. PATENT DOCUMENTS

| | | | |
|---|---|---|---|
| 4,522,775 | 6/1985 | Briggs et al. | 264/173 |
| 4,647,509 | 3/1987 | Wallace et al. | 428/474.9 |
| 4,675,780 | 6/1987 | Barnes et al. | 361/215 |
| 4,705,708 | 11/1987 | Briggs et al. | 428/35 |
| 5,373,870 | 12/1994 | Derroire et al. | 138/125 |
| 5,472,754 | 12/1995 | Douchet et al. | 428/36.91 |
| 5,514,299 | 5/1996 | Kalwara | 252/511 |

FOREIGN PATENT DOCUMENTS

| | | |
|---|---|---|
| 0 638 749 A1 | 2/1995 | (EP) . |
| 0 730 115 A1 | 9/1996 | (EP) . |
| 0 754 897 A1 | 1/1997 | (EP) . |
| PCT/US90/07327 | 7/1991 | (WO) . |

*Primary Examiner*—Patrick Brinson
(74) *Attorney, Agent, or Firm*—Bereskin & Parr

(57) ABSTRACT

A conduit for use as a filler pipe for transferring hydrocarbon containing fuels such as gasoline from an inlet point to a storage tank which is to be blow molded comprises a plurality of layers. The innermost layer is made from electrically conductive high density polyethylene and serves to bleed off static electricity generated during the fuel filling process. At least one of the other layers of the conduit comprises barrier material which inhibits the passage of hydrocarbon vapours through the walls of said conduit as hydrocarbon containing fuels flow along the conduit. Advantageously, the conduit may include a mounting tab intermediate the ends, the tab having a web portion which is electrically connected to the inner conductive layer to assist in locating the fuel filler conduit and providing additional conduct of static electrically to the vehicle body or frame.

A process for manufacturing such multi-layer conduit comprises simultaneously extruding a multiplicity of layers through a multiple head extruder. Advantageously, a tab as desired may be formed by pinching the extruded parison after initially blowing the parison and before finally blowing the parison.

12 Claims, 4 Drawing Sheets

MULTI-LAYER CONDUIT

This application is a continuation-in-part of application Ser. No. 09/192,295 filed Nov. 17, 1998 now abandoned.

FIELD OF THE INVENTION

This invention relates generally to multi-layered laminate structures which may be used to handle volatile, explosive liquids. In particular, the invention relates to a multi-layered laminated structure useful as a filler pipe for adding hydrocarbon containing fluids such as gasoline to a storage tank as may be carried in a vehicle having an internal combustion engine.

BACKGROUND OF THE INVENTION

Hydrocarbon containing fluids such as gasoline are the most common power source for internal combustion engines. Gasoline must be carried by the vehicle, usually in a fuel tank. The fuel tank is located at some convenient location within the structure of the vehicle. Often the fuel tank is contained within a reinforced area so as to provide crash protection for the fuel tank.

In order to provide a convenient access to the tank, the vehicle is typically fitted with a fuel filler inlet. Thus, there is required a conduit to extend between the fuel filler inlet and the tank. That conduct may be long or short and may be of convoluted configuration depending upon the relative location of the tank and the filler inlet.

Most hydrocarbon containing fuels are relatively volatile. Accordingly, the fuel filler conduit must contain at least one layer to substantially inhibit, if not totally prevent, passage of vapours from the liquid fuel to ambient atmosphere outside the filler pipe.

Previously fuel tanks and fuel filler pipes have been made of metal. However, for cost and other reasons, more recently fuel tanks have been manufactured of plastic materials. Fuel tanks being relatively large hollow structures are particularly suited to be made in blow molding procedures. With the advent of plastic rather than metallic fuel tanks, it is now desirable to use plastic fuel filler pipes.

It is well understood by those familiar with the handling and storage of fuels such as gasoline, that static electricity can be generated during the filling procedure. Static electricity in fuel storage systems is dependent primarily on the rate of fill, the amount of turbulence in the fuel as it passes along the conduit and the amount of charge present in the fuel before contacting the vehicle. As fuel is passed along the conduit there is a good likelihood that a static electricity charge will build up. If that charge is permitted to increase until a spark is generated there is a danger of explosion of fuel vapours. Such explosions can be catastrophic not only to the fuel system but the entire vehicle and those in the vicinity of the vehicle.

In the past when fuel tanks were manufactured from metals and fuel filler pipes were also metallic, the natural conductivity of the metal served to bleed off any static electricity as it was generated thus preventing an increase in charge to the point where there was a spark.

In almost all systems, the part of the filler head which touches the refuelling nozzle is made of a conductive material and that is connected directly to the vehicle ground. This effectively prevents a difference in electrical potential between the refuelling nozzle and the filler head and the vehicle. Thus, there is no spark discharge. However, when a plastic fuel filler pipe is desired, because of the normal insulative value of most plastic resins, there will be no readily available way to bleed off or ground the static electricity which may be built up along the filler pipe itself.

It is also desirable that fuel filler pipes when made of plastic be capable of being joined to related structure. At one end this means connection to the tank. At the other end this conduit will be joined to a filler coupling. Such connection at one or both ends may be made by welding, particularly where two similar thermoplastic materials are involved. Such welding is commonly done by raising the temperature of the two surfaces to be joined and then bringing the two molten surfaces into contact to enable fusion to occur as cooling occurs.

Connections may also be required or desired at points along the conduit and it may be especially desirable that one or more of such connections are electrically connected to assist in bleeding off static electricity.

Thus, there is need for a fuel filler conduit which may be economically manufactured from plastic resins which inhibits the passage of vapours through the conduit to the surrounding atmosphere and which at the same time provides an electrically conductive path sufficient to prevent the build up of static electricity by fuel passing along the conduit.

SUMMARY OF THE INVENTION

In accordance with the present invention a multi-layer conduit suitable for use as a filler conduit for hydrocarbon containing fuels includes a plurality of layers. The layers include an inner layer which is comprised of electrically conductive high density polyethylene based material. The layers also include a barrier material which acts as a barrier to reduce passage of hydrocarbons through the walls of the conduit.

In a first embodiment of the invention, the layers include an inner layer which is comprised of electrically conductive high density polyethylene based material. The conduit also includes an outer layer comprised of high density polyethylene. The conduit further includes a barrier layer of ethylene vinyl alcohol copolymer (EVOH) and two layers of adhesive, one on either side of the EVOH barrier layer for the purpose of bonding the EVOH layer to layers which are radially adjacent to the barrier layer. Advantageously, scrap regrind polyethylene based material may be used next to the conductive layer. In a particular advantageous embodiment, the first two layers comprise at least 50% of the weight per unit length of the conduit.

In another embodiment of the invention, advantageously, the conduit may be made from two layers, a radially inward layer which will be in contact with hydrocarbon fuel passing along the conduit which is electrically conductive high density polyethylene based material and a second, outward layer comprising Dupont SELAR, a blend of nylon copolymer, a proprietary adhesive for nylon and a high density polyethylene.

Advantageously, in another aspect of the invention a filler conduit, preferably incudes at least one tab for structurally attaching the conduit to a vehicle. The tab is located between the ends of the conduit and includes an electrically conductive portion for contacting a fastener. A portion of the tab is electrically conductive. This portion of the tab is electrically connected to the inner, electrically conductive layer of the conduit to assist in conducting static electricity.

DETAILED DESCRIPTION OF THE INVENTION

Figure 1:
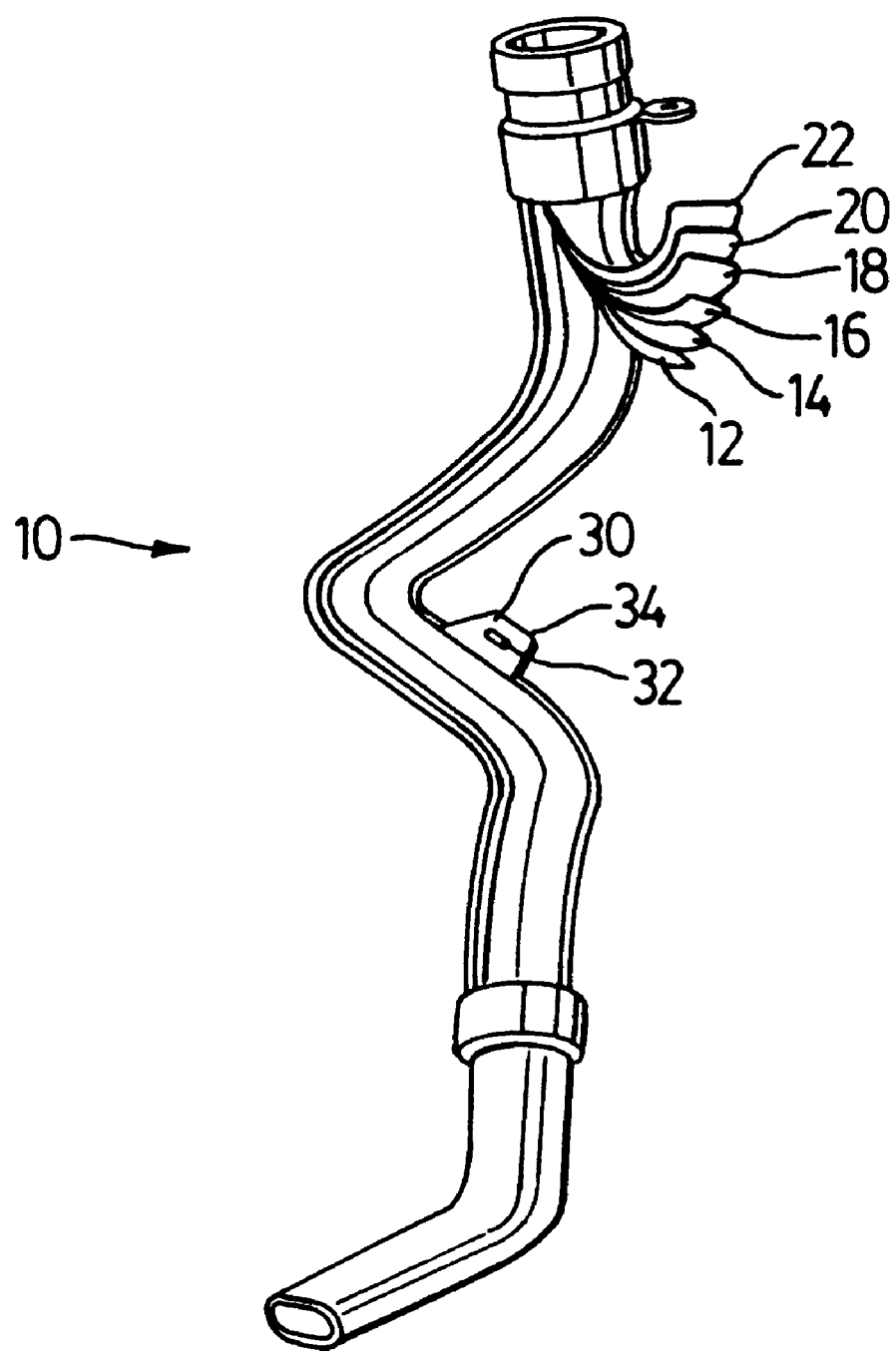
FIG. 1 is a perspective view of a multi-layer conduit with a portion cut open for illustrative purposes made in accordance with a preferred embodiment of this invention.
Figure 2:
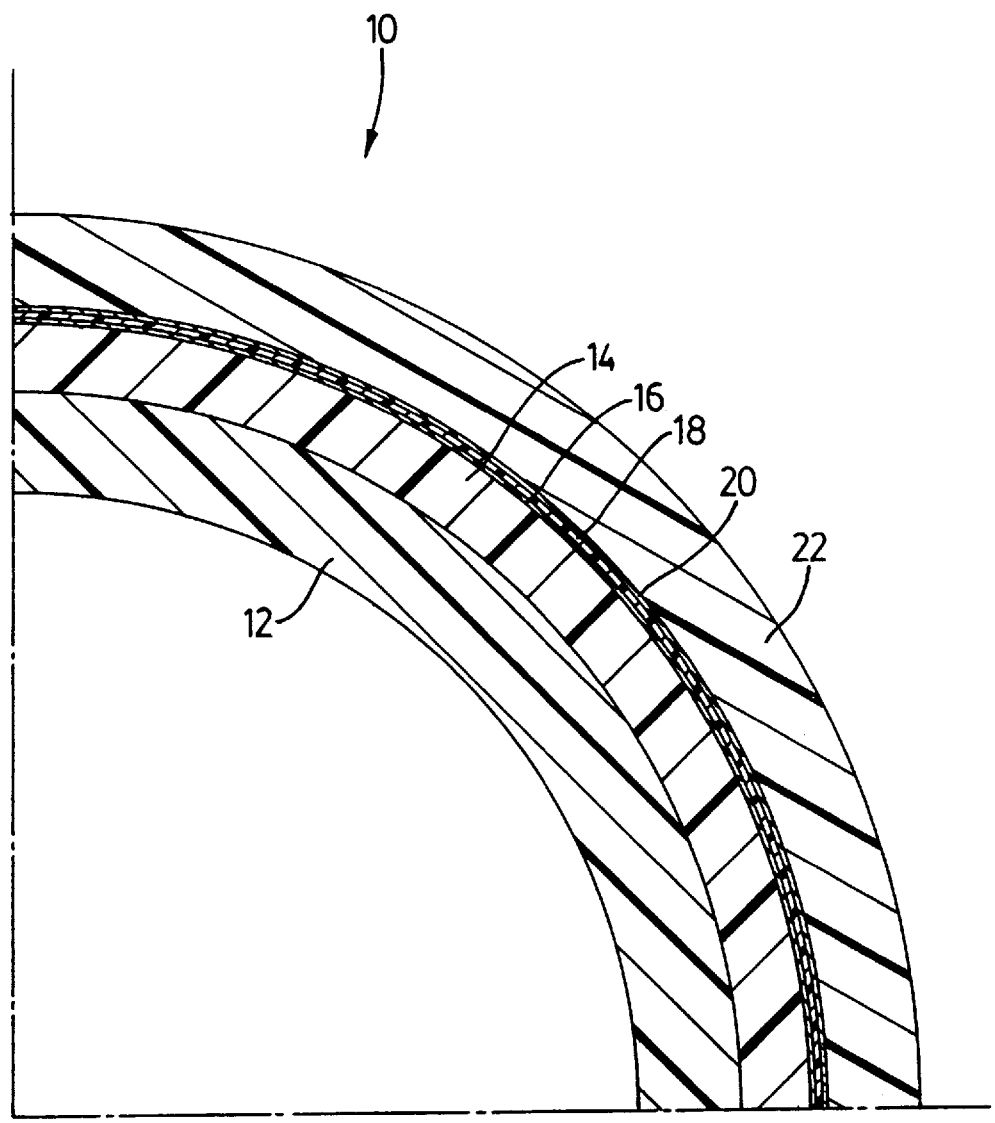
FIG. 2 is a schematic cross-sectional view of a quarter portion of the multi-layer conduit of FIG. 1.

The multi-layer conduit of the embodiment shown in FIGS. 1 and 2 at 10 comprises a plurality of layers. As shown in FIG. 2, the conduit comprises six layers commencing at the radially innermost layer 12 and progressing outwardly through layers 14, 16, 18, 20 and 22.

The inner layer 12 is made from electrically conductive, high density, polyethylene. The next adjacent layer 14 is made from high density polyethylene material which may be either virgin material or scrap material as will be discussed more fully hereinafter. The conduit includes a barrier layer 18 which is bonded to the adjacent layers by a layer of adhesive 16 on the radially inner surface and a layer of adhesive 20 on the radially outer surface. The outermost layer 22 is a layer of high density polyethylene.

The barrier layer 18 is made of ethylene, vinyl alcohol copolymer (EVOH). The barrier layer of ethylene, vinyl alcohol copolymer serves as a barrier for passage of gaseous hydrocarbons which are a typical components of fuels. The EVOH product is available from a number of suppliers. One such product is identified by the trade mark LC-101A and is available from Eval Company of America. The product is 27 mole percent ethylene and is sold as a high barrier resin for multi-layer barrier structures. This resin is said by its manufacturer to be the highest gas barrier EVOH material available. According to the manufacturer's specification, the resin may be used as an interior barrier layer of a multilayer food package as outlined by the U.S. Food and Drug Administration Regulations, provided that the EVOH layer is separated from direct food contact by a polymeric layer at least 1 ml thick. It has been found that this resin produces a suitable barrier to prevent transmission of hydrocarbon vapours typical of those found in fuels such as gasoline through the fuel filler conduit manufactured in accordance with this preferred embodiment of the invention.

In order to best adhere the barrier layer 18 to the layers of the conduit which are radially inwardly of and radially outwardly of, the barrier layer, adhesives 16 and 20 are used on the inner and outer surfaces of the barrier layer 18 respectively. A suitable adhesive for use in adhering the EVOH layer is the adhesive sold under the trade mark ADMER by Mitsui Petrochemicals (America) Ltd. This adhesive is sold for adhering the layer EVOH film to high density polyethylene or adhering high density polyethylene to nylon. In the preferred embodiment illustrated, the conduit has high density polyethylene next to both surfaces of the barrier layer and thus the same adhesive can be used on each surface of the barrier layer 16.

The inner layer 12 will be in contact with fuel passing along the conduit. Thus, static electricity is likely to be generated at the inner surface of the inner layer 12. The static electric may be present in the fuel from its remote storage or may be generated by the passage of the fuel along the conduit. As turbulence in the fuel will promote the formulation of static electricity, the amount of static electricity that will be generated may be dependent upon the configuration of the conduit which, in turn, may promote turbulence. In addition, the quality of the surface finish of the conduit may also be a factor in generating turbulence and thus generation of static electricity. The inner layer 12 is made suitably electrically conductive to dissipate static electricity thus preventing the build up of sufficient charge to cause sparks. High density polyethylene may be made sufficiently conductive by including within the resin, carbon black. One particularly advantageous form of carbon black is that sold under the trade mark PRINTEX XE 2 by Degussa AG of Frankfurt, Germany. Addition of carbon black, such as PRINTEX XE 2, into high density polyethylene produces a significant drop in the resistance of the polymer to electric current at relatively low concentration. According to the manufacturer of PRINTEX XE 2, only approximately $\frac{1}{3}$ to $\frac{1}{4}$ of the amount of conventional carbon black need be added to a polymeric resin to generate suitable conductivity for anti-static suitability of the resulting mixed resin. By way of example, the manufacturer suggests that additions of about 5–15% of PRNTEX XE 2 are sufficient to achieve conductivity values in the area of $<10^2$ ohm×cm in thermoplastics.

In accordance with the preferred embodiment considerable economies may be achieved by recycling scrap high density polyethylene. As will be well understood by those familiar with the blow molding art, there are often scrap or flash materials which must be removed from finished products. The non-use of that scrap material represents a cost. This product provides an opportunity to make use of what would otherwise would be waste high density polyethylene material. The material is reground and fed to the melt and extrusion process for use in the layer 14 of the conduit 10. The adjacent layer 14 thus may be made from virgin, high density polyethylene or scrap regrind material from this multi-layer conduit or scrap regrind, high density polyethylene, or combinations of the foregoing.

The outer layer 22 is preferably manufactured from virgin, high density polyethylene.

In order to provide the finished strength for use in most automotive applications, the layers are made at varying thicknesses. The thicknesses depend in part on the diameter of the conduit. Thus the values given below are given in weight percent terms of the over all unit length of conduit. The internal layer 12 may comprise approximately 20% by weight conductive high density polyethylene. The next layer 14 may comprise about 40% by weight of the material or combination of materials discussed above. The barrier layer 18 of EVOH material may comprise approximately 3% by weight of the conduit. Each adhesive layer 16, 20 on either side of the barrier layer 16 may comprise approximately 3% by weight of the conduit. The outermost layer 22 of virgin high density polyethylene material may comprise approximately 37% by weight of the conduit.

It is desirable that the combination of the innermost layers 12 and 14 together comprise at least 50% and preferably 60% of the weight of the conduit. This provides substantial weldable material at the inner surface of the multi-layer conduit. When the conduit is to be joined to other structures such as the tank at one end or a fuel filler at the opposite end, the material may most advantageously be joined by forming welds of the thermoplastic material. Typically, such welds are achieved by heating the surrounding material to which the conduit is to be joined as well as the multi-layer conduit to a molten condition. The two materials are then brought into contact under pressure so that the material from the multilayer conduit may fuse together with the material to which the multi-layer conduit is to be joined. It has been observed that appropriate welds can be made most easily if the combination of layers 12 and 14 are of weldable material and together comprise at least 50% of the weight of the conduit. This has been observed to provide high quality acceptable welds.

Another requirement for multi-layer conduits to be used as fuel fillers is ruggedness or resilience. The conduit may be handled roughly after its manufacture in transit to the installation where the conduit is to be fixed to a tank or to a vehicle. It is thus desirable that the exterior material has substantial impact resistance. This impact resistance may also be of considerable value once the fuel filler is installed on a vehicle to help resist failure of the fuel filler during the life of the vehicle. In order to assure as much impact resistance as possible given the nature of the material, it is desirable that the outer layer 22 be manufactured from virgin, high density polyethylene material. The virgin material will thus have predictable impact strength which would otherwise be somewhat variable if it were mixed with scrap material. Virgin, high density polyethylene material advantageously provides suitable impact resistance for this structure.

A multi-layer pipe of this invention may be manufactured in a multiple layer co-extrusion die. Such devices are available from companies such as Nextrom. Nextrom manufactures a die comprising different inputs each arranged concentrically to co-extrude a first, radially inner, layer and to co-extrude a plurality of layers radially adjacent thereto. To manufacture the product of the invention, the inner layer 12 would be extruded using a first channel. The next layer 14 is extruded in the same die at the same time as the other of the layers through an annular opening which is slightly downstream in the extruder from the opening extruding the layer 12. This effectively extrudes a tubular layer of material over the material which is to become the inner layer 12. The next layer extruded is the adhesive layer 16 followed by the EVOH barrier layer 18, followed by the adhesive layer 20 and then by the outer layer 22.

Following extrusion of the material in molten condition, a multi-layer parison is formed of the extruded material. The parison may then be placed in a blow mold cavity. Air pressure is introduced internally of the parison to mold the parison to a desired configuration for the fuel filler conduit. On cooling of the blown resin, the mold is opened to reveal the finished part. Any flash is then removed to form the finished product.

Figure 4:
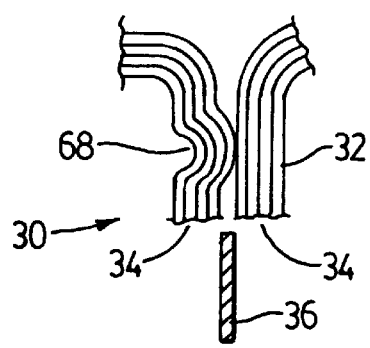
FIG. 4 is an enlarged cross-section view of a tab which may be formed by the portion of the mold shown in FIG. 3.
Figure 5:
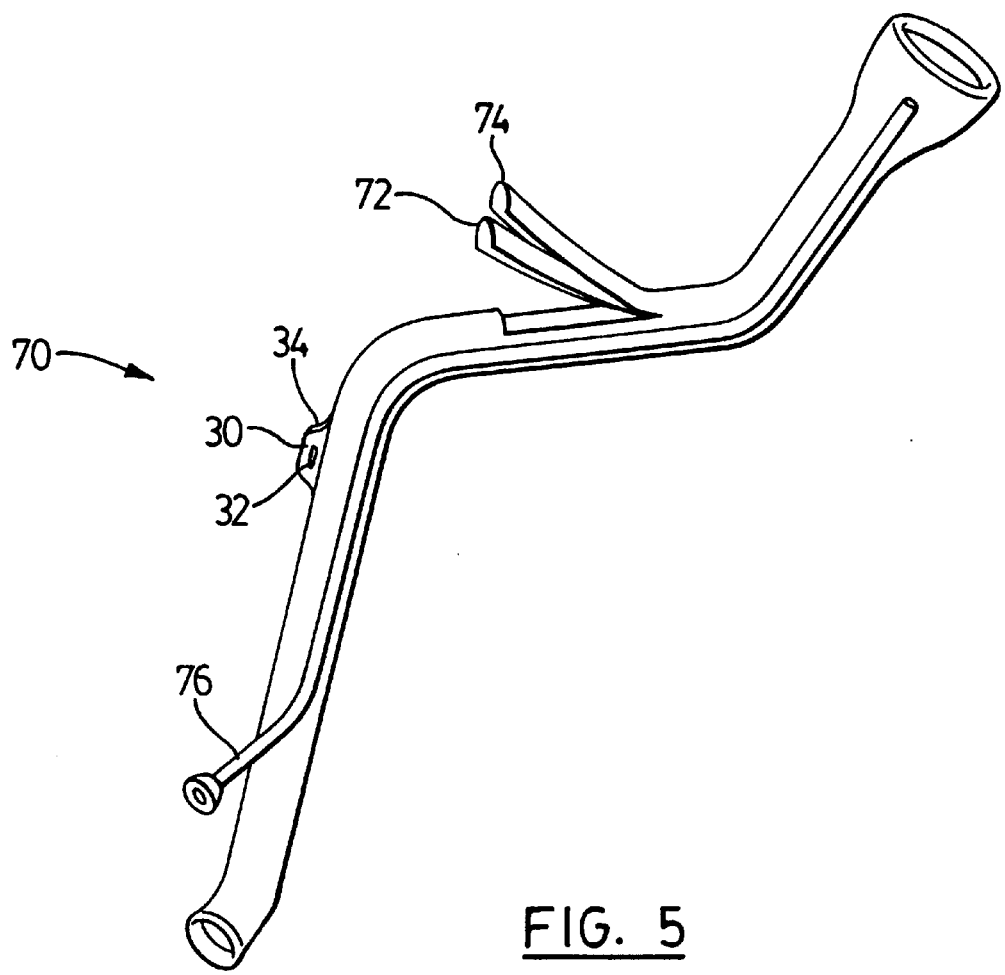
FIG. 5 is a perspective view of a multi-layer conduit with a portion cut open for illustrative purposes made in accordance with an alternate embodiment of this invention.

Each of the filler conduits shown in FIGS. 1 and 5 respectively advantageously, although not necessarily, may include a tab. The tab 30 is located between the first and second ends of the filler conduit. The tab may be used to attach the fuel filler pipe to a frame, body component or other supporting structure which will give support to the fuel filler conduit intermediate the ends. One or more of such tabs 30 may be molded as desired. The tab 30 comprises a central web 32 and a peripheral edge 34. The tab 30 further comprises a metallic plate 36 more clearly shown in FIG. 4.

As the tab will be used to attach the filler pipe to a portion of the vehicle body or frame, it is desirable that the attachment point also be part of the conductive path to dissipate static electricity. The tab is used by passing the fastener which itself is a conductor of electricity, through the web 32 of the tab and through the metallic plate 36. The metallic plate 36 is in contact with the inner conductive layer 12 of the parison material. Thus, static electricity building up along the interior surface of the conduit 10 can travel along the conductive layer 12 into the plate 36 and from the plate 36 to the fastener. The fastener is then connected to a grounded portion of the body to provide yet another path for discharge of static electricity being built up by passage of fluid along the conduit.

Figure 3:
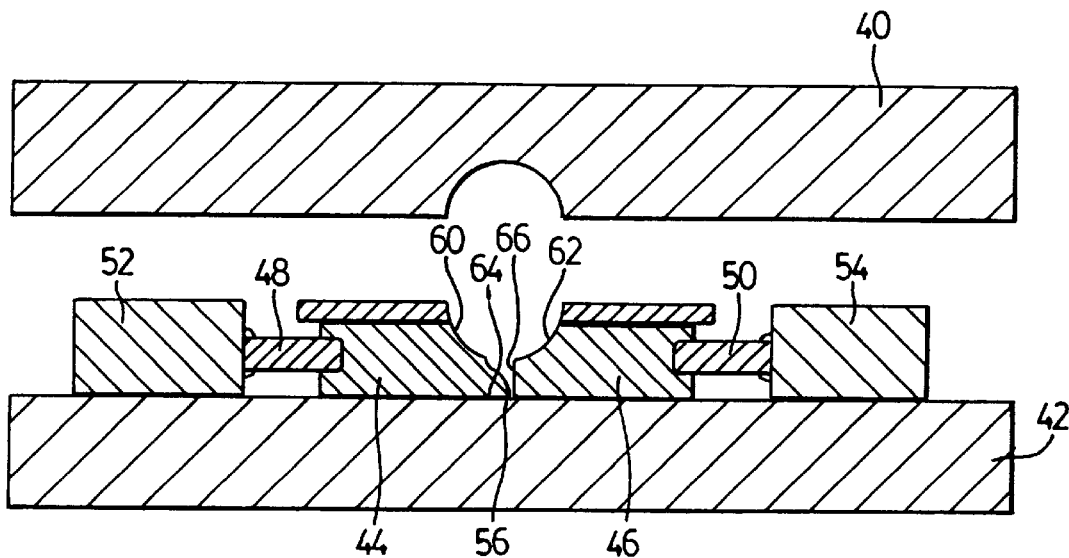
FIG. 3 is a cross-section through a portion of the blow mold which may be used to make the conduit of FIG. 1, the section being taken through the mold at the point which a tab may advantageously be molded to the filler conduit of this invention.

The tab 30 may be formed during the blow molding process. FIG. 3 illustrates the portion of the mold for shaping the multi-layer conduit at the location of the tab 30. For convenience purposes, the mold is shown as having upper and lower mold halfs. However, the molding of the filler conduit may occur with mold closure either vertically or horizontally. As shown in FIG. 3, the mold comprises a first member or half 40 and a second complimentary member or half 42. At all locations other than the vicinity of a tab, the mold halves 40 and 42 close together to comprise a shape which is substantially circular in cross-section to define the exterior configuration of the filler conduit. The mold is cut away in the desired vicinity of the tab. At the cut away portion, the mold half 42 is equipped with slides 44 and 46. In the orientation shown in FIG. 3, the slides 44 and 46 move horizontally left and right from the closed position shown in FIG. 3 to an open position. The slides 44 and 46 are respectively attached to threaded rods 48 and 50. The threaded rods 48 and 50 are in turn fixed to a hydraulic piston illustrated diagrammatically as blocks 52 and 54 respectively. Movement within the hydraulic blocks 52 and 54 moves the slides 44 and 46 laterally as illustrated in FIG. 3.

It will be observed that slide 44 comprises a projection 56 which projects toward the slide 46. The molding face of the slides 44 and 46 respectively include the substantially quarter circular surfaces 60 and 62 as well as the planar surfaces 64 and 66.

The conduit 10 and the integral tab 30 may be produced at the same time. A parison is extruded between the mold halves 40 and 42. If the parison is extruded vertically then the mold halves 40 and 42 may close substantially horizontally. If the mold halves 40 and 42 are horizontally arranged as shown in FIG. 3 for convenience, then the parison after extrusion would have to be placed between the mold halves 40 and 42. The mold halves 40 and 42 are enclosed about the parison with the slides 44 and 46 in the open position. Blowing gas is then admitted to the interior of the parison in typical blow molding fashion. This will expand the parison against the molding surface of mold half 40 and against the molding surface of the slides 44 and 46. Thus, all of the parison material will be expanded so that the exterior of the parison touches the surfaces 60 and 64 of the slide 44 and the surfaces 62 and 66 of the mold 46. In addition, a portion of the exterior surface of the parison will contact the portion of the mold half 42 between the molding surfaces of the slides 44 and 46. At that time, the pressure of the blowing gas is then vented.

The next step in the process is the closure of the slides 44 and 46. The slides are moved inwardly to the position shown in FIG. 3. This effectively pinches the portion of the parison creating the final configuration of the exterior surface of the filler conduit. The projection 56 further pinches the parison wall as shown in FIG. 4. The pinch is identified as portion 68 in FIG. 4. It will be observed that the pinch formed by the projection 56 leaves the two interior surfaces of the parison opposite the projection 56 in substantial contact with one another. After the slides are closed, blowing gas under pressure is again administered to the interior of the parison to form the final interior configuration of the interior of the parison. The part is then allowed to cool, the mold is then opened and the part removed from the mold.

After removal of the part from the mold, the periphery of the tab 30 adjacent the edge 34 is then cut by a knife leaving an open surface. The metallic plate 36 is then passed into the open surface between the edges 34 in the wall of the tab 30. The plate 36 is passed into the tab and between the pinched portion of the parison opposite the portion 68 ensuring that the plate 36 is in good electrical contact with the conductive inner layer of the formed filler pipe, the pinched portion of the parison serves to retain the plate 36 under friction until such time as a fastener is passed through the tab. Advantageously, the fastener may be passed through the tab by starting the point of the fastener in the portion 68 shown in FIG. 4. This ensures that the fastener itself will be in good electrical contact with the plate 36 as well as both inner layers of the tab 30 at the web 32.

The multi-layer conduit of the invention thus provides a conduit having a multiplicity of layers, the innermost layer being electrically conductive to prevent the build-up of sufficient voltage of static energy to cause a spark. Any charge built up on the conduit during transfer of fuel through the fuel filler conduit is conducted away to the fuel storage tank, its grounding system or to the fuel filler opening and its ground to the vehicle. Thus, the entire fuel system during the filling operation comprising the filling nozzle, the filler pipe inlet, the conduit and the tank can all be commonly grounded, thus eliminating the chances of a spark resulting from a discharge of static electricity. At the same time the conduit is effective in preventing the release of hydrocarbon vapours into the surrounding atmosphere.

FIG. 5 illustrates an alternative embodiment of the invention. In FIG. 5 the multi-layer conduit 70 comprises two layers of material. These are shown at 72 and 74.

The inner layer 72 is manufactured from conductive material which is essentially the same as the material used to make the conductive layer 12 of the embodiment discussed above. The principal difference is that in the second embodiment the layer 74 is manufactured from single material which meets all of the requirements of the fuel filler conduit. The material sold by the Dupont Company under the trade mark SELAR RB is sold as a barrier resin for plastic fuel tanks. The barrier resin sold by Dupont is said to be a pellet blend of a nylon copolymer and a proprietary adhesive for nylon and high density polyethylene. The SELAR material provides the required barrier performance to reduce evaporative emissions from plastic fuel tanks.

We have found that this material is also adequate to meet the barrier requirements of a fuel filler conduit. The SELAR material also meets the requirements of impact resistance as discussed above as well as meeting the requirements for weldability. The SELAR material however does not provide an electrically conductive path and thus is not suitable on its own for use in structures where build-up of static electricity is a problem. In the embodiment illustrated in FIG. 5, the inner layer 72 is manufactured from electrically conductive material, thus providing all of the static discharge requirements as discussed more fully above.

In order to produce the multi-layer conduit 70, a die having two annular extrusion openings is used. The electrically conductive material 72 is extruded through a first annular opening. The SELAR material 74 may be extruded from a second annular opening which is downstream from the first opening to effectively provide a tubular coating on the material which is being extruded from the first annular opening. This produces a two material multi-layer conduit. The two materials both being essentially high density polyethylene will bond together during the extrusion process to provide a unitary laminar structure having an electrically conductive inner surface and a suitable barrier effect for use as a filler conduit for hydrocarbon fuels.

The advantage of the second embodiment is that only two layers of material are required. Where this is economically advantageous as compared to the embodiment illustrated in FIGS. 1 and 2, resort may be had to this embodiment.

With the embodiment shown in FIG. 5, it is also possible to form conduits having a tab 30 with electrically conductive web 32 as discussed above. The blow molding operation and the molding equipment is essentially the same for manufacture of both embodiments. The only essential difference in the process is the nature of the material of the parison which is initially extruded for the blow molding process.

FIGS. 1 and 5 illustrate conduits 10 and 70 respectively. Advantageously, each conduit may be used with an auxiliary conduit 76 as shown in FIG. 5. The auxiliary conduit 76 may be joined to the conduits 10 and 60 respectively adjacent the input end. The input end is enlarged in the molding process to take typical filler opening hardware. Advantageously, the conduit 76 may be connected to the fuel tank to provide an alternate air flow route. Upon filling the tank as liquid passes along the filler conduits 10 and 60 respectively, air must be released from the tank to permit filling. The air may then pass along the conduit 76 in the opposite direction and be discharged to the atmosphere adjacent the filler opening.

Other materials may be used as barrier layers. These include polyamide and polyketones. One particular useful polyketone is that sold under the trade mark CARILON by the Shell Oil organization. When using a polyketone as the barrier layer an adhesive which may be used is the adhesive sold under the trade mark BYNEL by E.I. Dupont. The polyamide resin can be adhered using the ADMER adhesive discussed above.

Figure 6:
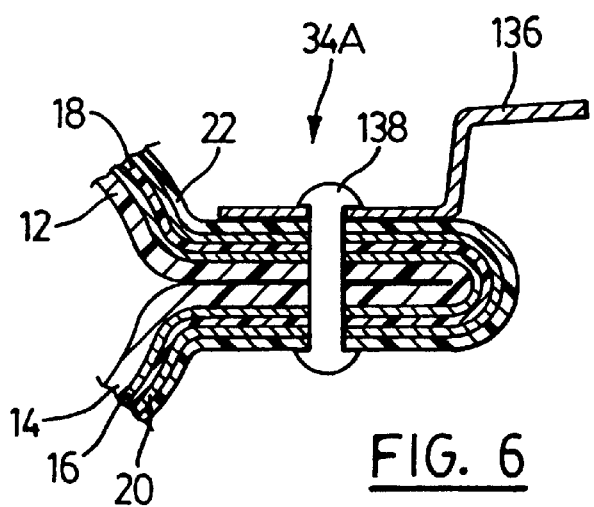
FIG. 6 is a cross-section through a tab which is an alternative embodiment of the tab shown in FIG. 4.

In the embodiment illustrated in FIGS. 1 and 5, the tab 30 has a central web 32 and a peripheral edge 34. The metallic plate 36 as shown in FIG. 4 is inserted within the tab so as to be directly in contact with the inner conductive layer 12 or 72. An alternate embodiment for creating the electrical ground for a tab 34A is illustrated in FIG. 6. As illustrated in FIG. 6, the conduit 10 comprises a multilayer structure. The inner layer 12 is made from electrically conductive high density polyethylene as explained in association with FIG. 1. The next adjacent layer 14 is made from either virgin material or scrap material as discussed above. The conduit 10 also comprises the barrier layer 18 and the adhesive layers 16 and 20. Finally, the conduit comprises an outermost layer 22 of high density polyethylene.

In the embodiment illustrated in FIG. 6, the tab 34A includes an electrically conductive plate 136. The electrically conductive plate may conveniently be made from metal. The principal difference between the tab 34A illustrated in FIG. 6 as compared to the tab 34 illustrated in FIG. 4 is that the electrically conductive plate 136 of tab 34A is not in direct contact with the inner conductive layer 12 as is the case in tab 34 and as illustrated in FIG. 4. Rather, in tab 34A, the electrically conductive plate 136 comprises an aperture to accommodate a fastener 138. The fastener 138 passes directly through the tab 34A so that the fastener is in contact with the inner layer 12 as well as being in contact with the plate 136. The fastener 38 is an electrically conductive material such as metal. Accordingly, with the tab 34A, the electrical conductivity path includes the inner layer 12, the fastener 138 and the plate 136. The plate 136 may be used to mount the fuel filler conduit to convenient body structure and to achieve electrical grounding.

The fastener 138 illustrated in FIG. 6 is in the form of a metallic rivet. While a rivet has been illustrated in FIG. 6, other types of fasteners such as screws may be used. The only requirement is that the fastener have good electrical contact with the inner layer 12 as well as good electrical contact with the plate 136 to complete the electrical path for grounding purposes.

The tab 34A may be formed using the same moulds as illustrated in FIG. 3 except that the slide 44 would not include the projection 56 illustrated in FIG. 3. With this embodiment, the closure of slides 44 and 46 results in formation of the tab 34A between the substantially planar surfaces 64 and 66 and the small portion of the surface of the mold member 42 between the slides 44 and 46. After removal of the product from the mold, then the fastener 138 may be passed through the plate 136 and through the tab 34A to affix the plate 136 to the tab 34 and to make the electrically conductive path.

Various other changes may be made to the multi-layer conduit. The outer layer can have fire retardant (either halogenated or non halogenated) additives. In addition, the outer layer may have heat resistance additives. When desired, the outer layer may be polypropylene or a polyamide.

In accordance with statutory requirements, preferred embodiments of the invention have been described in detail herein, although the scope of the invention is not limited thereto, but rather, by the scope of the attached claims.

We claim:

1. A multi-layer conduit suitable for use as a filler conduit for hydrocarbon containing fuels comprising a plurality of layers including:
   i) an inner layer, said inner layer comprised of electrically conductive high density polyethylene, and
   ii) a barrier layer, said barrier layer substantially inhibiting the passage of gaseous hydrocarbons from inside said filler conduit through said conduit as hydrocarbon fuel travels along said conduit and wherein said conduit comprises a tab, said tab located intermediate ends of said conduit, said tab comprising a web, and said web of said tab is electrically connected to said inner layer of said conduit.

2. The conduit of claim 1, said conduit comprising a plurality of layers including:
   i) said inner layer;
   ii) an outer layer, said outer layer comprised of high density polyethylene, and
   iii) said barrier layer, said barrier layer comprising ethylene vinyl alcohol copolymer and said barrier layer located intermediate said inner and outer layers,
   said conduit further comprising adhesive for adhering said barrier layer to layers radially inwardly of and radially outwardly of said barrier layer.

3. The conduit of claim 2 wherein said conduit further comprises an adjacent layer adjacent said inner layer comprised of high density polyethylene based material.

4. The conduit of claim 3 wherein said adjacent layer comprises one or more of the materials selected from the group consisting of virgin high density polyethylene, scrap regrind high density polyethylene and scrap regrind multi-layer material of claim 3.

5. The conduit of claim 4 wherein said inner layer and said adjacent layer together comprise at least 50% by weight of said conduit.

6. The conduit of claim 5 wherein said inner layer and said adjacent layer together comprise at least 60% by weight of said conduit.

7. The conduit of claim 1 wherein said conduit comprises an inner layer of electrically conductive high density polyethylene and a layer of barrier material, said barrier material comprising a pellet blend of a nylon copolymer and an adhesive and high density polyethylene.

8. The conduit of claim 1 wherein said web of said tab comprises an electrically conductive plate.

9. The conduit of claim 8 wherein said tab further comprises a fastener for fixing said plate to said tab.

10. The conduit of claim 9 wherein said conductive plate is in direct electrical contact with said inner layer of said conduit.

11. The conduit of claim 9 wherein said fastener is in direct electrical contact with said inner layer of said conduit.

12. The conduit of claim 11 wherein said conductive plate is in direct electrical contact with said fastener.

* * * * *